US009773511B2

(12) United States Patent
Sehlstedt

(10) Patent No.: US 9,773,511 B2
(45) Date of Patent: Sep. 26, 2017

(54) DETECTOR AND METHOD FOR VOICE ACTIVITY DETECTION

(75) Inventor: Martin Sehlstedt, Luleå (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 794 days.

(21) Appl. No.: 13/121,305

(22) PCT Filed: Oct. 18, 2010

(86) PCT No.: PCT/SE2010/051118
§ 371 (c)(1), (2), (4) Date: Mar. 28, 2011

(87) PCT Pub. No.: WO2011/049516
PCT Pub. Date: Apr. 28, 2011

(65) Prior Publication Data

US 2011/0264449 A1 Oct. 27, 2011

Related U.S. Application Data

(60) Provisional application No. 61/376,815, filed on Aug. 25, 2010, provisional application No. 61/262,583, filed on Nov. 19, 2009, provisional application No. 61/252,966, filed on Oct. 19, 2009, provisional application No. 61/252,858, filed on Oct. 19, 2009.

(51) Int. Cl.

| | |
|---|---|
| ***G10L 21/00*** | (2013.01) |
| ***G10L 25/78*** | (2013.01) |
| *G10L 15/00* | (2013.01) |
| *H04R 3/00* | (2006.01) |

(Continued)

(52) U.S. Cl.
CPC .................................. *G10L 25/78* (2013.01)

(58) Field of Classification Search
USPC ....... 704/214, 226, 233, 227, 219, 224, 225, 704/228, 223; 381/92, 94.7; 370/352
See application file for complete search history.

(56) References Cited

U.S. PATENT DOCUMENTS 4,167,653 A * 9/1979 Araseki et al. ............... 704/233
5,473,702 A * 12/1995 Yoshida ................. H04R 3/005 381/94.6

(Continued)

FOREIGN PATENT DOCUMENTS

EP 0548054 A2 6/1993
EP 1265224 A1 12/2002

(Continued)

*Primary Examiner* — Neeraj Sharma
(74) *Attorney, Agent, or Firm* — Coats & Bennett, PLLC

(57) ABSTRACT

The embodiments of the present invention relates to a voice activity detector and a method thereof. The voice activity detector is configured to detect voice activity in a received input signal comprising an input section configured to receive a signal from a primary voice detector of said VAD indicative of a primary VAD decision and at least one signal from at least one external VAD indicative of a voice activity decision from the at least one external VAD, a processor configured to combine the voice activity decisions indicated in the received signals to generate a modified primary VAD decision, and an output section configured to send the modified primary VAD decision to a hangover addition unit of said VAD.

22 Claims, 7 Drawing Sheets

(51) Int. Cl.

| | |
|---|---|
| *H04B 15/00* | (2006.01) |
| *H04L 12/66* | (2006.01) |

(56) References Cited

U.S. PATENT DOCUMENTS

| | | | | |
|---|---|---|---|---|
| 6,424,938 | B1 | 7/2002 | Johansson et al. | |
| 7,440,891 | B1 * | 10/2008 | Shozakai et al. | 704/233 |
| 7,761,294 | B2 * | 7/2010 | Kim | G10L 25/78 704/226 |
| 2002/0075856 | A1 * | 6/2002 | LeBlanc | G10L 25/78 370/352 |
| 2002/0116187 | A1 * | 8/2002 | Erten | 704/233 |
| 2003/0053639 | A1 * | 3/2003 | Beaucoup et al. | 381/92 |
| 2003/0228023 | A1 * | 12/2003 | Burnett et al. | 381/92 |
| 2006/0053007 | A1 * | 3/2006 | Niemisto | 704/233 |
| 2006/0224381 | A1 * | 10/2006 | Makinen | G10L 25/78 704/223 |
| 2007/0094018 | A1 * | 4/2007 | Zinser et al. | 704/219 |
| 2008/0040109 | A1 * | 2/2008 | Muralidhar | G10L 25/87 704/233 |
| 2009/0089053 | A1 | 4/2009 | Wang et al. | |
| 2009/0222264 | A1 * | 9/2009 | Pilati | G10L 25/78 704/233 |
| 2010/0017205 | A1 * | 1/2010 | Visser et al. | 704/225 |
| 2010/0121634 | A1 * | 5/2010 | Muesch | 704/224 |
| 2010/0268532 | A1 | 10/2010 | Arakawa et al. | |
| 2011/0066429 | A1 * | 3/2011 | Shperling et al. | 704/228 |
| 2011/0106533 | A1 * | 5/2011 | Yu | 704/233 |

FOREIGN PATENT DOCUMENTS

| | | | |
|---|---|---|---|
| GB | 2430129 | A | 3/2007 |
| JP | 2002540441 | A | 11/2002 |
| WO | 2007030190 | A1 | 3/2007 |
| WO | 2007091956 | A2 | 8/2007 |
| WO | 2008/143569 | A1 | 11/2008 |
| WO | 2009069662 | A1 | 6/2009 |

* cited by examiner

DETECTOR AND METHOD FOR VOICE ACTIVITY DETECTION

RELATED APPLICATIONS

This application is filed under 35 U.S.C. §371 as a National Stage Application of International Patent App. No. PCT/SE2010/051118 filed Oct. 18, 2010, and claims priority to U.S. 61/376,815 filed Aug. 25, 2010, U.S. 61/252,858 filed Oct. 19, 2009, U.S. 61/252,966 filed Oct. 19, 2009, and U.S. 61/262,583 filed Nov. 19, 2009, each of which is incorporated herein by reference in its entirety.

TECHNICAL FIELD

The present invention relates to a method and a voice activity detector and in particular to an improved voice activity detector for handling e.g. non stationary background noise.

BACKGROUND

In speech coding systems used for conversational speech it is common to use discontinuous transmission (DTX) to increase the efficiency of the encoding. The reason is that conversational speech contains large amounts of pauses embedded in the speech, e.g. while one person is talking the other one is listening. So with DTX the speech encoder is only active about 50 percent of the time on average and the rest can be encoded using comfort noise. Some example codecs that have this feature are the AMR NB (Adaptive MultiRate Narrowband).

For high quality DTX operation, i.e. without degraded speech quality, it is important to detect the periods of speech in the input signal this is done by the Voice Activity Detector (VAD). FIG. 1 shows an overview block diagram of a generalized VAD 180, which takes the input signal 100, divided into data frames, 5-30 ms depending on the implementation, as input and produces VAD decisions as output 160. I.e. a VAD decision 160 is a decision for each frame whether the frame contains speech or noise).

The generic VAD 180 comprises a background estimator 130 which provides subband energy estimates and a feature extractor 120 providing the feature subband energy. For each frame, the generic VAD calculates features and to identify active frames the feature(s) for the current frame are compared with an estimate of how the feature "looks" for the background signal.

The primary decision, "vad_prim" 150, is made by a primary voice activity detector 140 and is basically just a comparison of the features for the current frame and the background features (estimated from previous input frames), where a difference larger than a threshold causes an active primary decision. The hangover addition block 170 is used to extend the VAD decision from the primary VAD based on past primary decisions to form the final VAD decision, "vad_flag" 160, i.e. older VAD decisions are also taken into account. The reason for using hangover is mainly to reduce/remove the risk of mid speech and backend clipping of speech bursts. However, the hangover can also be used to avoid clipping in music passages. An operation controller 110 may adjust the threshold(s) for the primary detector and the length of the hangover addition according to the characteristics of the input signal.

There are a number of different features that can be used for VAD detection, one feature is to look just at the frame energy and compare this with a threshold to decide if the frame comprises speech or not. This scheme works reasonably well for conditions where the SNR is good but not for low SNR cases. In low SNR it is instead required to use other metrics comparing the characteristics of the speech and noise signals. For real-time implementations an additional requirement of VAD functionality is computational complexity and this is reflected in the frequent representation of subband SNR VADs in standard codecs e.g. AMR NB, AMR WB (Adaptive Multi-Rate WideBand) and G.718 (ITU-T recommendation embedded scalable speech and audio codec).

While the subband SNR based VAD combines the SNR's of the different subbands to a metric which is compared to a threshold for the primary decision. In the subband based VAD, the SNR is determined for each subband and a combined SNR is determined based on those SNRs. The combined SNR, may be a sum of all SNRs on different subbands. There are also known solutions where multiple features with different characteristics are used for the primary decision. However, in both cases there is just one primary decision that is used for adding hangover, which may be adaptive to the input signal conditions, to form the final decision. Also many VAD's have an input energy threshold for silence detection, i.e. for input levels that are low enough, the primary decision is forced to the inactive state.

For VADs based on subband SNR principle it has been shown that the introduction of a non-linearity in the subband SNR calculation, called significance thresholds, can improve VAD performance for conditions with non-stationary noise (babble, office). Non-stationary noise can be difficult for all VADs, especially under low SNR conditions, which results in a higher VAD activity compared to the actual speech and reduced capacity from a system perspective. Of the non-stationary noise the most difficult is babble noise and the reason is that its characteristics are relatively close to the speech signal the VAD is designed to detect. Babble noise is usually characterized both by the SNR relative to the speech level of the foreground speaker and the number of background talkers, where a common definition (as used in subjective evaluations) is that babble should have 40 or more background speakers, the basic motivation being that for babble it should not be possible to follow any of the included speakers in the babble noise (non of the babble speakers shall become intelligible). It should also be noted that with an increasing number of talkers in the babble noise it becomes more stationary. With only one (or a few) speaker(s) in the background they are usually called interfering talker(s). A further problematic issue is that babble noise may have spectral variation characteristics very similar to some music pieces that the VAD algorithm shall not suppress.

In the previously mentioned VAD solutions AMR NB/WB and G.718 there are varying degrees of problem with babble noise in some cases already at reasonable SNRs (20 dB). The result is that the assumed capacity gain from using DTX can not be realized. In real mobile phone systems it has also been noted that it may not be enough to require reasonable DTX operation in 15-20 dB SNR. If possible one would desire reasonable DTX operation down to 5 dB even 0 dB depending on the noise type. For low frequency background noise an SNR gain of 10-15 dB can be achieved for the VAD functionality just by highpass filtering the signal before VAD analysis. Due to the similarity of babble to speech the gain from highpass filtering the input signal is very low.

From a quality point of view it is better to use a failsafe VAD, meaning that when in doubt it is better for the VAD to signal speech input and just allow for a large amount of extra activity. This may, from a system capacity point view, be acceptable as long as only a few of the users are in situations with non-stationary background noise. However, with an increasing number of users in non-stationary environments the usage of failsafe VAD may cause significant loss of system capacity. It is therefore becoming important to work on pushing the boundary between failsafe and normal VAD operation so that a larger class of non-stationary environments are handled using normal VAD operation.

Though the usage of significance thresholds which improves VAD performance it has been noted that it may also cause occasional speech clippings, mainly front end clippings of low SNR unvoiced sounds.

For existing solutions when a new problem area is identified it can be difficult to find a new tuning of an existing VAD that does not change the behavior of the VAD for already working conditions. That is, while it would be possible to change the tuning to cope with the new problem, it may not be possible to make the tuning without changing the behavior in already known conditions.

SUMMARY

The embodiments of the present invention provides a solution for retuning existing VAD's to handle non-stationary backgrounds or other discovered problem areas.

Thus by allowing multiple VAD's to work in parallel and then combine the outputs, it is possible to exploit the strengths from the different VAD's without suffering too much from each VAD's limitations.

In one embodiment to be used in situations when one wants to reduce excessive activity, the primary decision of the first VAD is combined with a final decision from an external VAD by a logical AND. The external VAD is preferably more aggressive than the first VAD. An aggressive VAD implies a VAD which is tuned/constructed to generate lower activity compared to a "normal" VAD. The main purpose of an aggressive VAD is that it should reduce the amount of excessive activity compared to a normal/original VAD. Note that this aggressiveness only may apply to some particular (or limited number of) condition(s) e.g. concerning noise types or SNR's.

Another embodiment can be used in situations when one wants to add activity without causing excessive activity, the primary decision of the first VAD may in this embodiment be combined with a primary decision from an external VAD by a logical OR.

Thus according to a first aspect of embodiments of the present invention a method in a voice activity detector (VAD) for detecting voice activity in a received input signal is provided. In the method, a signal is received from a primary voice detector of said VAD indicative of a primary VAD decision and at least one signal is received from at least one external VAD indicative of a voice activity decision from the at least one external VAD. The voice activity decisions indicated in the received signals are combined to generate a modified primary VAD decision, and the modified primary VAD decision is sent to a hangover addition unit of said VAD.

According to a second aspect of embodiments of the present invention, a voice activity detector (VAD) is provided. The VAD is configured to detect voice activity in a received input signal comprising an input section configured to receive a signal from a primary voice detector of said VAD indicative of a primary VAD decision and at least one signal from at least one external VAD indicative of a voice activity decision from the at least one external VAD. The VAD further comprises a processor configured to combine the voice activity decisions indicated in the received signals to generate a modified primary VAD decision and an output section configured to send the modified primary VAD decision to a hangover addition unit of said VAD.

By combining an existing VAD with one or more external VAD's it is possible to improve overall VAD performance with only minor effect on internal states of the original VAD—which may be a requirement for other codec functions, e.g. frame classification and codec mode selection.

A further advantage with embodiments of the present invention is that the use of multiple VAD's does not affect normal operation, i.e. when the SNR of the input signal is good. It is only when the normal VAD function is not good enough that the external VAD should make it possible to extend the working range of the VAD.

If the external VAD works properly for the noise causing problems, the solution of an embodiment allows the external VAD to override the primary decision from the first VAD, i.e. preventing false activity on background noise only.

Further, addition of more external VADs makes it possible to reduce the amount of excessive activity or allow detection of additional previously clipped speech (or audio). Adaptation of the combination logic to the current input conditions may be needed to prevent that the external VAD's increase the excessive activity or introduce additional speech clipping. The adaptation of the combination logic could be such that the external VAD's are only used during input conditions (noise level, SNR, or nose characteristics [stationary/non-stationary]) where it has been identified that the normal VAD is not working properly.

DETAILED DESCRIPTION

Figure 1:
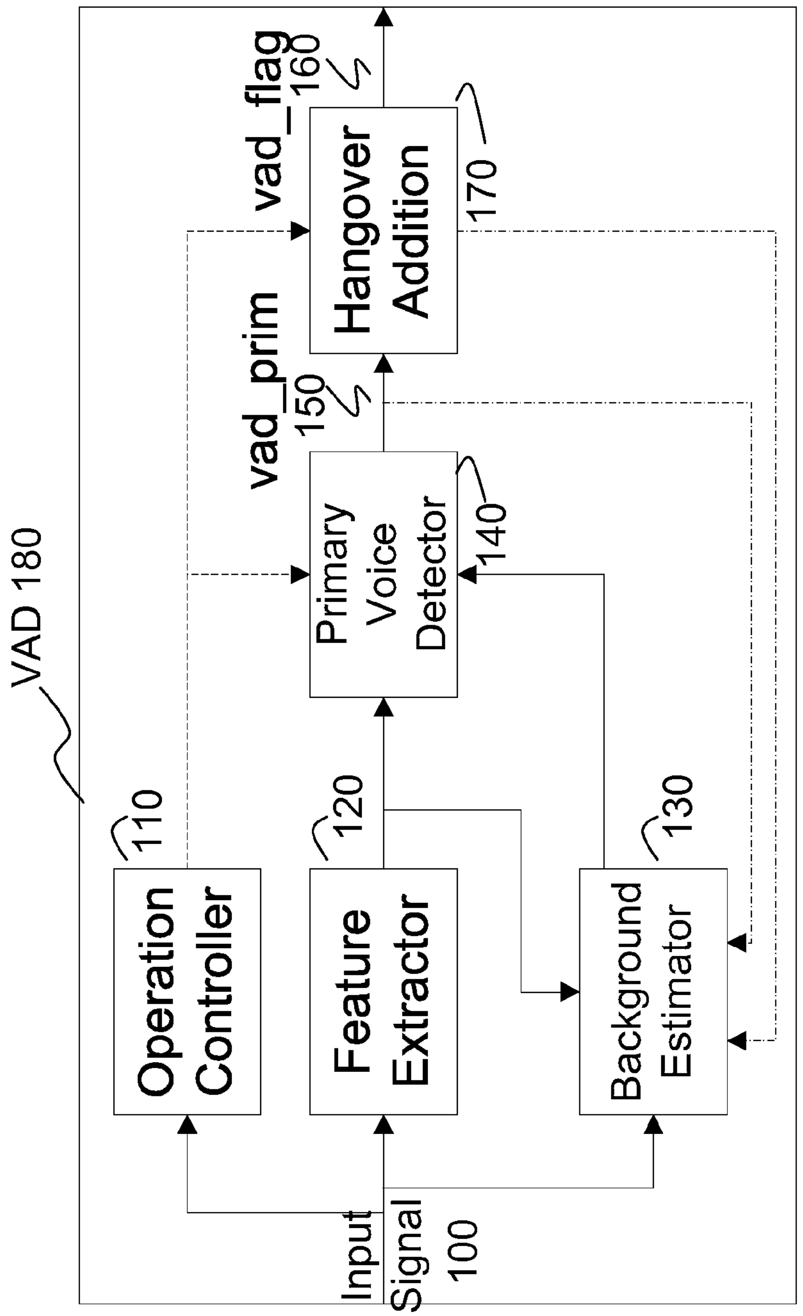
PRIOR ART FIG. 1
FIG. 1 shows a generic VAD with background estimation according to prior art.

The embodiments of the present invention will be described more fully hereinafter with reference to the accompanying drawings, in which preferred embodiments of the invention are shown. The embodiments may, however, be embodied in many different forms and should not be construed as limited to the embodiments set forth herein; rather, these embodiments are provided so that this disclosure will be thorough and complete, and will fully convey the scope of the invention to those skilled in the art. In the drawings, like reference signs refer to like elements.

Moreover, those skilled in the art will appreciate that the means and functions explained herein below may be implemented using software functioning in conjunction with a programmed microprocessor or general purpose computer, and/or using an application specific integrated circuit (ASIC). It will also be appreciated that while the current embodiments are primarily described in the form of methods and devices, the embodiments may also be embodied in a computer program product as well as a system comprising a computer processor and a memory coupled to the processor, wherein the memory is encoded with one or more programs that may perform the functions disclosed herein.

Figure 2:
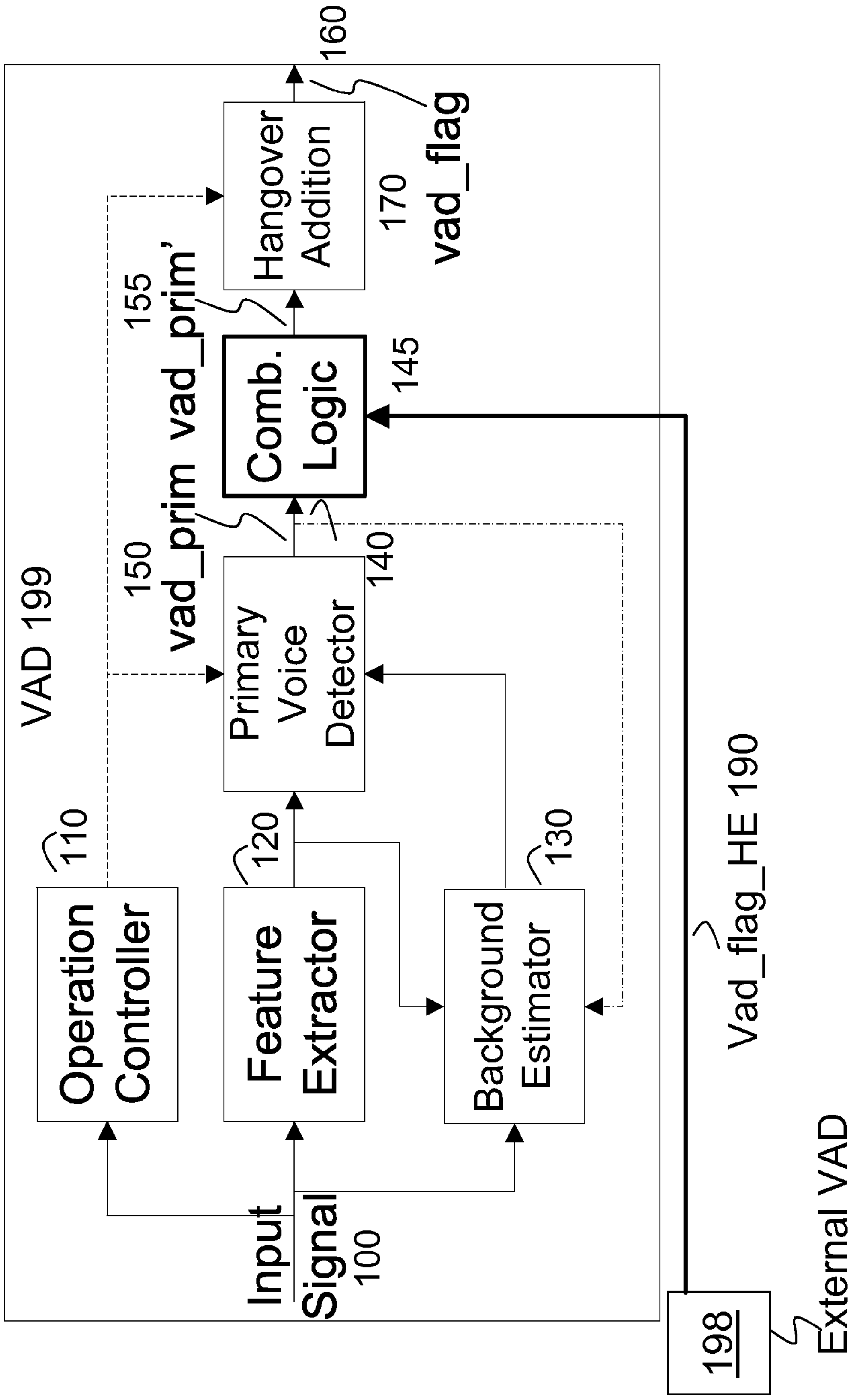
FIGS. 2-5 show generic VAD with background estimation including the multi VAD combination logic according to embodiments of the present invention.
Figure 3:
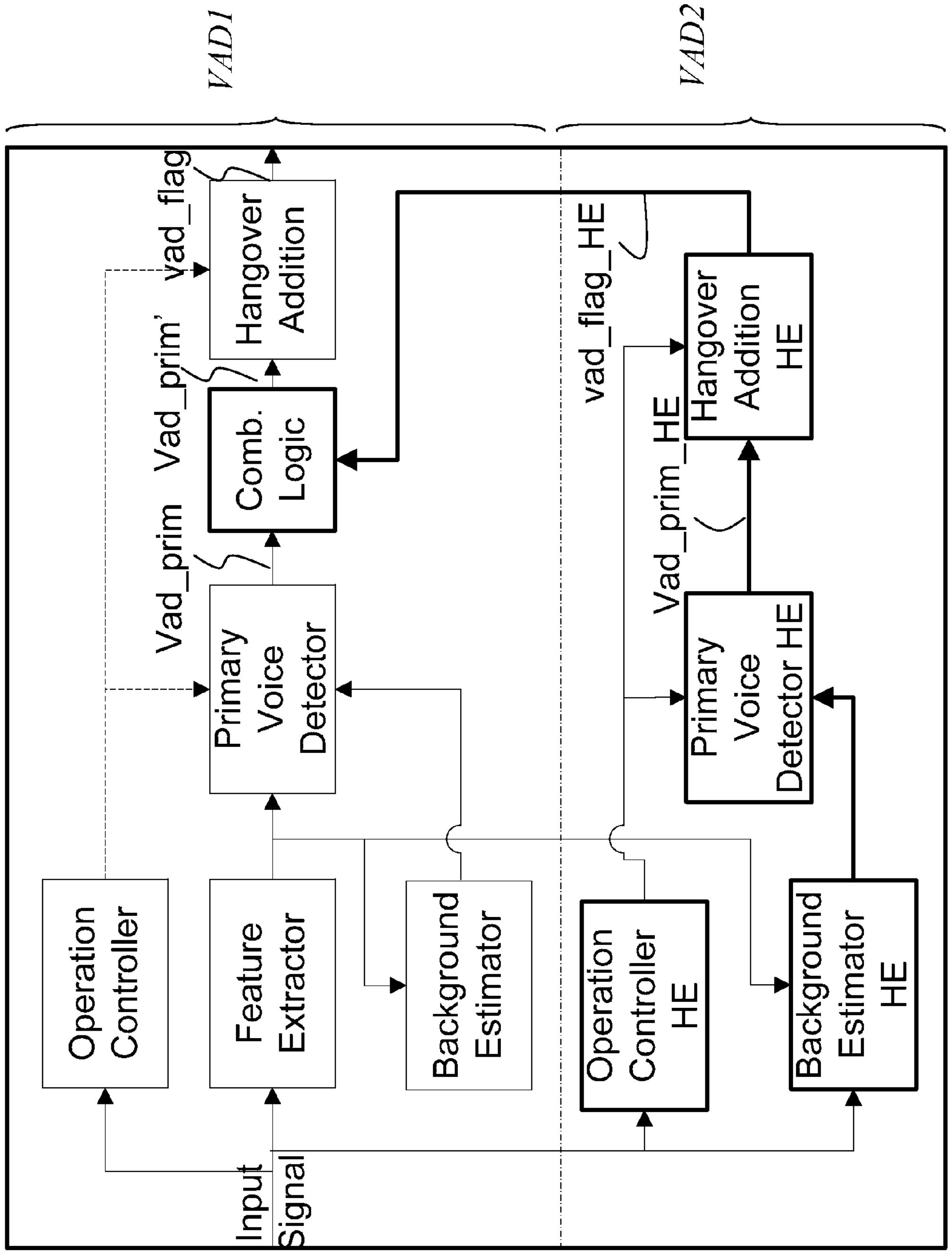

FIG. 2 shows a first VAD 199 with background estimation as in FIG. 1. A difference is that the VAD further comprises a combination logic 145 according to a first embodiment of the present invention. In this embodiment, the performance of the first VAD is improved with the introduction of an external vad_flag_HE 190 from an external VAD 198 to the combination logic 145 which is introduced before the hangover addition 170. It should be noted that the way the external VAD 198 is used will not affect the primary voice activity detector 140 and the normal behaviour of the VAD during good SNR conditions. By forming the new primary decision referred to as vad_prim' 155 in the combination logic 145 through a logical AND between the primary decision vad_prim from the first VAD and the final decision referred to as vad_flag_he 190 from the external VAD 198, this results in that excessive activity of the VAD can be avoided. The first embodiment is also shown in FIG. 3 which also schematically illustrates the external VAD VAD2. FIG. 3 is further explained below.

With the external VAD according to the embodiments described above, it is possible to reduce the excessive activity for additional noise types. This is achieved as the external VAD can prevent false active signals from the original VAD. Excessive activity implies that the VAD indicates active speech for frames which only comprise background noise. This excessive activity is usually a result of 1) non-stationary speech like noise (babble) or 2) that the background noise estimation is not working properly due to non-stationary noise or other falsely detected speech like input signals.

According to a second embodiment, the combination logic forms a new primary decision referred to as vad_prim' through a logical OR between the primary decision vad_prim from the first VAD and the primary decision referred to as vad_prim_HE from the external VAD. In this way it is possible to add activity to correct undesired clipping performed by the first VAD.

Figure 4:
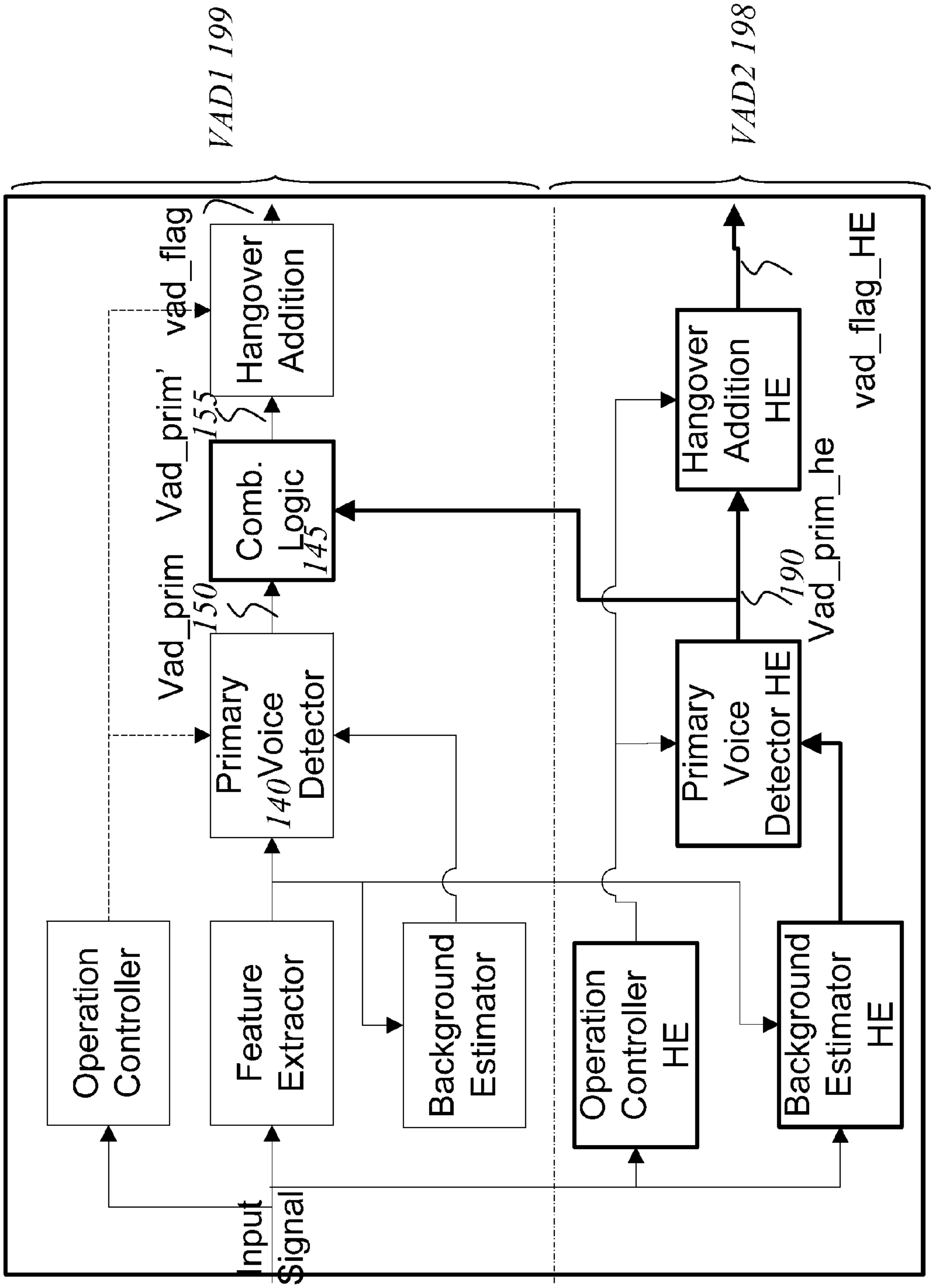

The second embodiment is illustrated in FIG. 4 which also shows the external VAD 198, the combination logic 145 forms a primary decision referred to as vad_prim' 155 through a logical OR between the primary decision vad_prim 150 of the primary VAD 140 of the first VAD 199 and the primary decision referred to as vad_prim_he 190 from the external VAD 198. This results in that the external VAD 198 can be used to avoid clipping caused by the first VAD 199. Hence, the external VAD 198 is able to correct errors caused by the first VAD 199, which implies that missed detected activity by the first VAD 199 can be detected by the external VAD 198. In order to avoid increasing excessive activity it is an advantage to use the primary decision of the external VAD.

Figure 5:
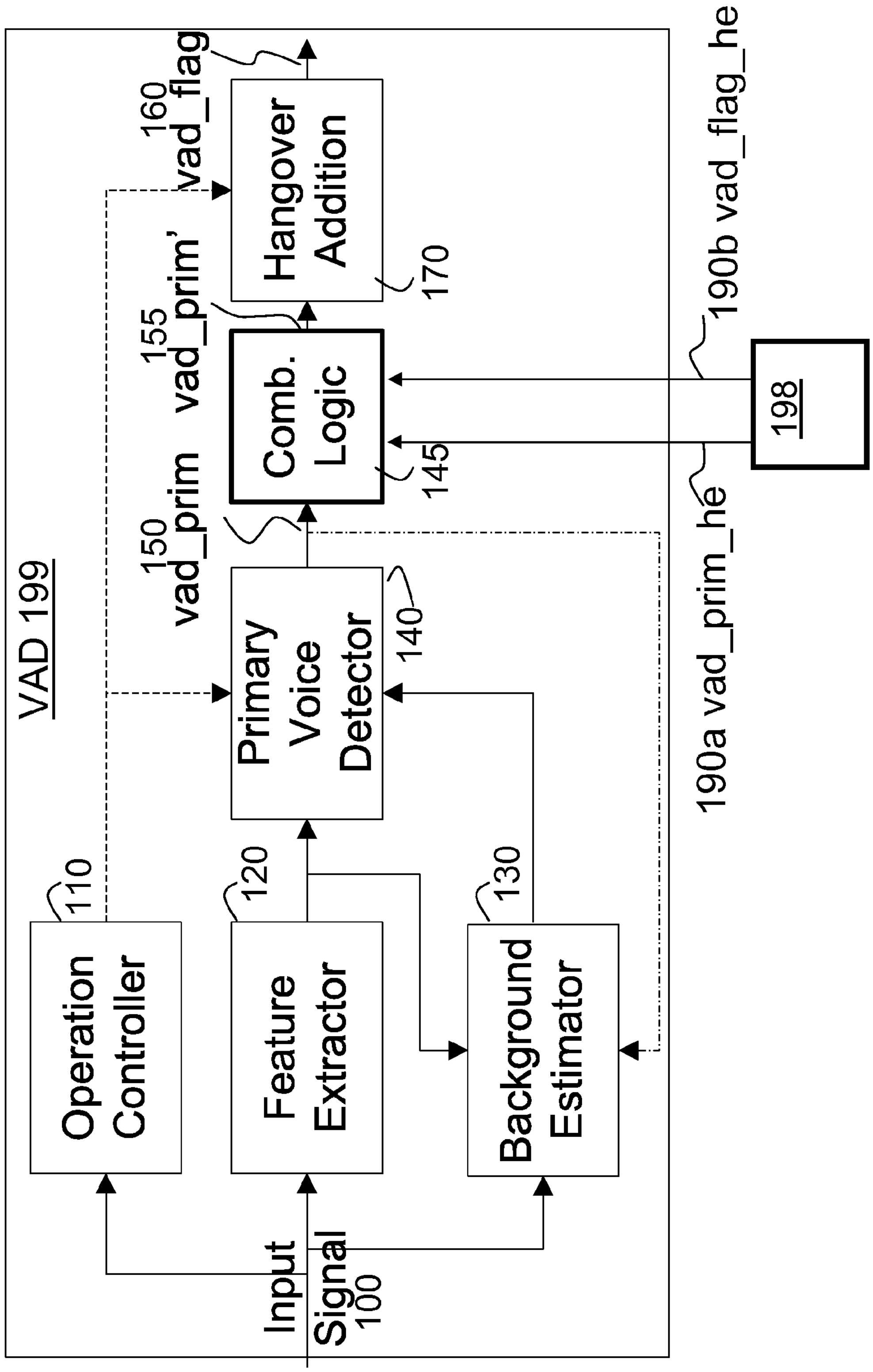

Turning now to FIG. 5, corresponding to FIG. 2 showing a third embodiment. In the third embodiment, the combination logic 145 forms a new primary decision referred to as vad_prim' 155 through a combination of the primary decision vad_prim 150 from the first VAD 140 and the final 190*a* and the primary decisions 190*b* from the external VAD. This is illustrated in FIG. 5. These three decisions may be combined by using any combination of AND and/or OR in the combination logic 145. As one example it is possible to use the primary decisions of the first and the external VADs to be combined with a logical OR before combining with the final decision of the external VAD by using a logical AND. Then it would be possible to also detect previously clipped segments.

According to a fourth embodiment VAD decisions from more than one external VAD are used by the combination logic to form that new Vad_prim'. The VAD decisions may be primary and/or final VAD decisions. If more than one external VAD is used, these external VADs can be combined prior to the combination with the first VAD. E.g. Vad_prim 86 (external_vad_1 & external_vad_2).

In this specification the primary decision of the VAD implies the decision made by the primary voice activity detector. This decision is referred to Vad_prim or local VAD. The final decision of the VAD implies the decision made by the VAD after the hangover addition. The combined logic according to embodiments of the present invention is introduced in a VAD and generates a Vad_prim' based on the Vad_prim of the VAD and an external VAD decision from an external VAD. The external VAD decision can be a primary decision and/or a final decision of one or more external VADs. The combined logic is configured to generate the Vad_prim' by applying a logic AND or logic OR on the Vad_prim of the first VAD and the VAD decision or VAD decisions from the external VAD(s).

Referring to FIGS. 3 and 4 which are block diagrams of the first VAD and the external VAD. The block diagrams show the two VAD's consisting of the original VAD (VAD 1) and the external VAD (VAD 2) with combination logic for generation of the improved vad_prim in the original VAD according to embodiments.

As indicated in FIGS. 3 and 4 the two VAD's share the feature extractor. The external VAD may use a modified background update and a primary voice activity detector. The modified background update comprises a modification in the background noise update strategy wherein the normal noise update deadlock recovery is slowed down and adds an alternative possibility for noise updates to allow the noise estimate to better track the noise. The modified primary voice activity detector may add significance threshold and an updated threshold adaptation based on energy variations of the input. These two modifications may be used in parallel.

To make a primary decision for the first VAD, referred to VAD 1 a variable SNR sum, snr_sum, is compared with a calculated threshold, thr1 in order to determine whether the input signal is active speech (localVAD=1 which corresponds to Vad_prim=1) or noise (localVAD=0 which corresponds to Vad_prim=0) in prior art as indicated below:

```
localVAD = 0;
if ( snr_sum > thr1 ) {
   localVAD = 1;
}
```

Using the combination logic according to embodiments of the present invention, a logical AND is applied on the localVAD from the first VAD and the final decision from the external VAD, referred to as vad_flag_he. That is, with the use of the combination logic the primary voice activity detector is only allowed to become active if both the localVAD from the first VAD and vad_flag_he from the external VAD are active. I.e.,

```
localVAD = 0;
if ( snr_sum > thr1 && vad_flag_he ) {
  localVAD = 1;
}
```

The modification has been underlined for easy identification. As the value of vad_flag_he is needed the code for the external VAD including its hangover addition needs to be executed before one can generate the modified VAD 1 decision.

In a fifth embodiment, the combination logic is configured to be signal adaptive, i.e. changing the combination logic depending on the current input signal properties. The combination logic could depend on the estimated SNR, e.g. it would be possible to use an even more aggressive second VAD if the combination logic is configured such that only the original VAD is used in good conditions. While for noisy conditions the aggressive VAD is used as in embodiment 1. With this adaptation the aggressive VAD could not introduces speech clippings in good SNR conditions, while in noisy conditions it is assumed that the clipped speech frames are masked by the noise.

One purpose of some embodiments of the present invention is to reduce the excessive activity for non-stationary background noises. This can be measured using objective measures by comparing the activity of mixtures encoded. However, this metric does not indicate when the reduction in activity starts affecting the speech, i.e. when speech frames are replaced with background noise. It should be noted that in speech with background noise not all speech frames will be audible. In some cases speech frames may actually be replaced with noise without introducing an audible degradation. For this reason it is also important to use subjective evaluation of some of the modified segments.

The objective results presented below are based on mixtures of speech with background noises under varying conditions, with respect to different speech samples in several languages for different noise environments and signal to noise ratios (SNR's).

Mixtures were created with different noise samples and with different SNR conditions. The noises were categorized as Exhibition noise, Office noise, and Lobby noise as representations for non-stationary background noises. Speech and noise files were mixed, with the speech level set to −26 dBov and four different SNR's in the range 10-30 dB.

The prepared samples were then processed both by using the codec with the original VAD according to prior art and with the codec using the combined VAD solution (denoted Dual VAD) according to embodiments of the present invention.

For the objective results the speech activity generated by the different codecs using the different VAD solutions are compared and the results can be found in the table below. Note that the activity figures in the table are measured for the complete sample which is 120 seconds each. A tool used for level adjustments of the speech clips indicated that the speech activity of the clean speech files was estimated to 21.9%.

Table Summary of activity results: total, noise types, and SNR's

| Condition | Original | Dual VAD | Activity reduction |
|---|---|---|---|
| All noises/SNR's | 50.5 | 34.0 | 16.5 |
| Exhibition noise all SNR | 50.4 | 35.7 | 14.7 |
| Office noise all SNR | 67.1 | 41.7 | 25.4 |
| Lobby noise all SNR | 33.9 | 24.4 | 9.5 |
| 30 dB SNR | 29.3 | 23.4 | 5.9 |
| 20 dB SNR | 43.6 | 29.1 | 14.5 |
| 15 dB SNR | 58.5 | 37.3 | 21.2 |
| 10 dB SNR | 70.6 | 46.0 | 24.6 |

The results show that one embodiment of the present invention shown in FIG. 3, provides a reduction in activity.

Figure 7:
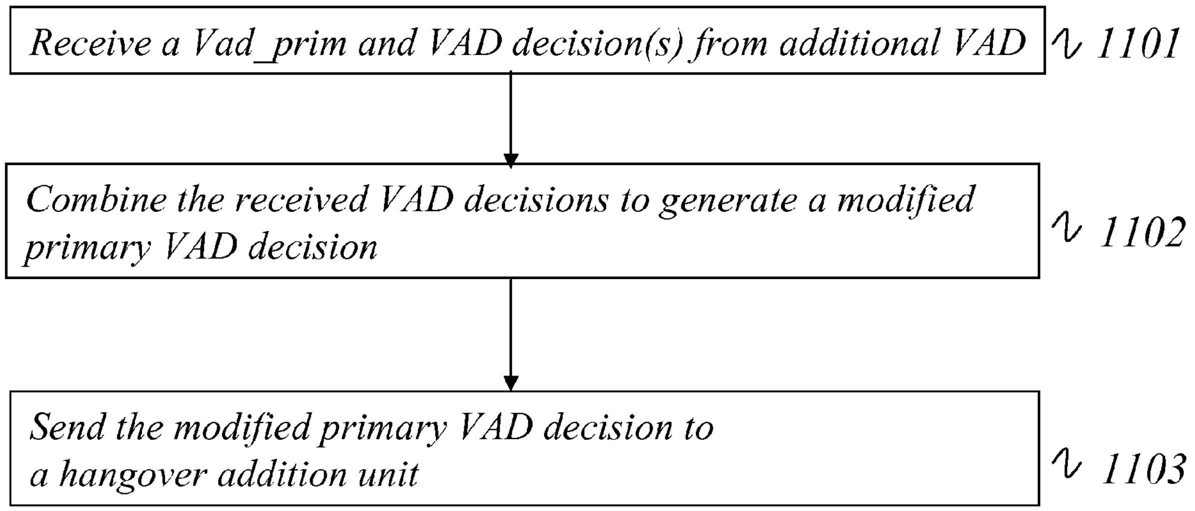
FIG. 7 is a flowchart of a method according to embodiments of the present invention.

According to one aspect of embodiments, a method in a combination logic of a VAD is provided as illustrated in the flowchart of FIG. 7. The VAD is configured to detect voice activity in a received input signal. A signal from a primary voice detector of said VAD indicative of a primary VAD decision and at least one signal from at least one external VAD indicative of a voice activity decision from the at least one external VAD are received 1101. The voice activity decisions indicated in the received signals are combined 1102 to generate a modified primary VAD decision. The modified primary VAD decision is sent 1103 to a hangover addition unit of said VAD to be used for making the final VAD decision.

The voice activity decisions in the received signals may be combined by a logical AND such that the modified primary VAD decision of said VAD indicates voice only if both the signal from the primary VAD and the signal from the at least one external VAD indicate voice.

Moreover, the voice activity decisions in the received signals may also be combined by a logical OR such that the modified primary VAD decision of said VAD indicates voice if at least one signal of the signal from the primary VAD and the signal from the at least one external VAD indicate voice.

The at least one signal from the at least one external VAD may indicate a voice activity decision from the external VAD which a final and/or primary VAD decision.

Figure 6:
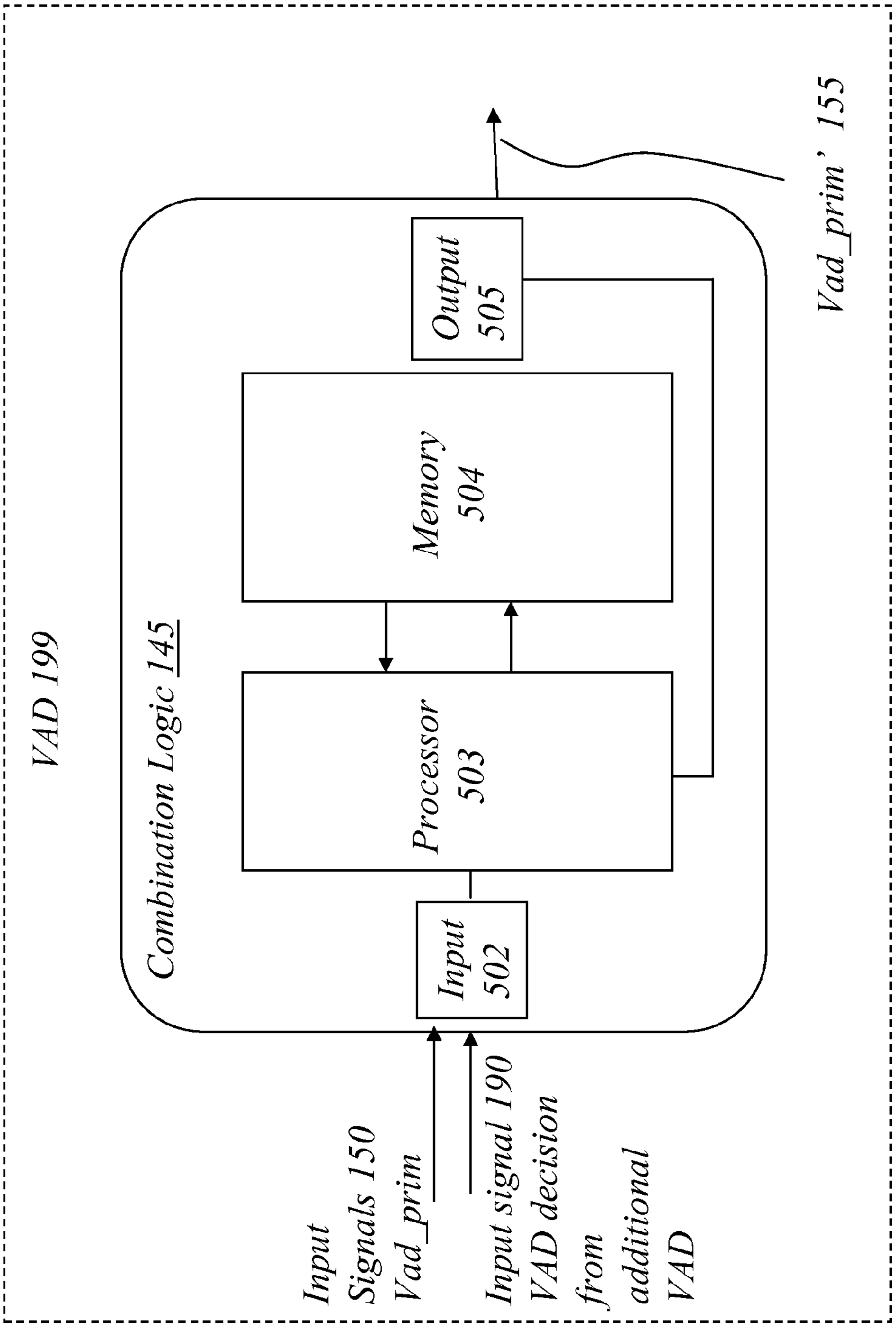
FIG. 6 discloses a combination logic according to embodiments of the present invention.

According to another aspect of embodiments, a VAD configured to detect voice activity in a received input signal is provided as illustrated in FIG. 6. The VAD comprises an input section 502 for receiving a signal 150 from a primary voice detector of said VAD indicative of a primary VAD decision and at least one signal 190 from at least one external VAD indicative of a voice activity decision from the at least one external VAD. The VAD further comprises a processor 503 for combining the voice activity decisions indicated in the received signals to generate a modified primary VAD decision, and an output section 505 for sending the modified primary VAD decision 155 to a hangover addition unit of said VAD. The VAD may further comprise a memory for storing history information and software code portions for performing the method of the embodiments. It should also be noted, as exemplified above, that the input section 502, the processor 503, the memory 504 and the output section 505 may be embodied in a combination logic 145 in the VAD.

According to an embodiment, the processor 503 is configured to combine voice activity decisions in the received signals by a logical AND such that the modified primary VAD decision of said VAD indicates voice only if both the signal from the primary VAD and the signal from the at least one external VAD indicate voice.

According to a further embodiment, the processor 503 is configured to combine voice activity decisions in the received signals by a logical OR such that the modified primary VAD decision of said VAD indicates voice if at least one signal of the signal from the primary VAD and the signal from the at least one external VAD indicate voice.

Modifications and other embodiments of the disclosed invention will come to mind to one skilled in the art having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of this disclosure. Although specific terms may be employed herein, they are used in a generic and descriptive sense only and not for purposes of limitation.

The invention claimed is:

1. A method in a first voice activity detector, VAD, for detecting voice activity in a received input signal, the method comprising:

receiving a signal from a primary voice detector of said first VAD indicative of a primary voice activity decision made by the primary voice detector regarding voice activity in said input signal, wherein the primary voice activity decision is an intermediate voice activity decision of said first VAD in the sense that the primary voice activity decision is made by the first VAD without having been processed by a hangover addition unit of said first VAD, receiving one or more signals from one or more second VADs external to the first VAD each indicative of a voice activity decision made by a respective second VAD regarding voice activity in said input signal, each second VAD comprising its own primary voice detector and hangover addition unit distinct from that of said first VAD, combining the voice activity decisions indicated in the signal received from the primary voice detector of said first VAD and the one or more signals received from the one or more second VADs to generate a modified primary voice activity decision, and sending the modified primary voice activity decision to a hangover addition unit of said first VAD that is configured to make a final voice activity decision of said first VAD.

2. The method according to claim 1, wherein the voice activity decisions in the signals received from the primary voice detector and the one or more second VADs are combined by a logical AND, the modified primary voice activity decision thereby indicating voice only if the signal from the primary voice detector and each signal from the one or more second VADs indicate voice.

3. The method according to claim 1, wherein the voice activity decisions in the signals received from the primary voice detector and the one or more second VADs are combined by a logical OR, the modified primary voice activity decision thereby indicating voice if at least one signal of the signal from the primary voice detector and the one or more signals from the one or more second VADs indicate voice.

4. The method according to claim 1, wherein at least one signal from a second VAD is a final voice activity decision made by that second VAD in the sense that the final voice activity decision is made by the second VAD after having been processed by the hangover addition unit of said second VAD.

5. The method according to claim 1, wherein at least one signal from a second VAD is a primary voice activity decision made by a primary voice detector of that second VAD, the primary voice activity decision being an intermediate voice activity decision of the second VAD in the sense that the primary voice activity decision is made by the second VAD without having been processed by the hangover addition unit of said second VAD.

6. The method according to claim 1, comprising receiving only one signal from one of said second VADs.

7. The method according to claim 1, comprising receiving a plurality of signals from a plurality of said second VADs.

8. The method according to claim 1, wherein the voice activity decisions indicated in the signals received from the primary voice detector and the one or more second VADs are combined in dependence on input signal properties.

9. The method according to claim 8, wherein the input signal properties comprise at least one of estimated signal-to-noise-ratio and background characteristics.

10. A first voice activity detector, VAD, configured to detect voice activity in a received input signal, the first VAD comprising:

an input circuit configured to:

receive a signal from a primary voice detector of said first VAD indicative of a primary voice activity decision regarding voice activity in said input signal, wherein the primary voice activity decision is an intermediate voice activity decision of said first VAD in the sense that the primary voice activity decision is made by the first VAD without having been processed by a hangover addition unit of said first VAD, and receive one or more signals from one or more second VADs external to the first VAD each indicative of a voice activity decision made by a respective second VAD regarding voice activity in said input signal, each second VAD comprising its own primary voice detector and hangover addition unit distinct from that of said first VAD, a processor circuit configured to combine the voice activity decisions indicated in the signal received from the primary voice detector of said first VAD and the one or more signals received from the one or more second VADs to generate a modified primary voice activity decision, and an output circuit configured to send the modified primary voice activity decision to a hangover addition unit of said first VAD that is configured to make a final voice activity decision of said first VAD.

11. The first VAD according to claim 10, wherein the processor circuit is configured to combine the voice activity decisions in the signals received from the primary voice detector and the one or more second VADs by a logical AND, the modified primary voice activity decision thereby indicating voice only if the signal from the primary voice detector and each signal from the one or more second VADs indicate voice.

12. The first VAD according to claim 10, wherein the processor circuit is configured to combine the voice activity decisions in the signals received from the primary voice detector and the one or more second VADs by a logical OR, the modified primary voice activity decision thereby indicating voice if at least one signal of the signal from the primary voice detector and the one or more signals from the one or more second VADs indicate voice.

13. The first VAD according to claim 10, wherein at least one signal from a second VAD is a final voice activity decision made by that second VAD in the sense that the final voice activity decision is made by the second VAD after having been processed by the hangover addition unit of said second VAD.

14. The first VAD according to claim 10, wherein at least one signal from a second VAD is a primary voice activity decision made by a primary voice detector of that second VAD, the primary voice activity decision being an intermediate voice activity decision of the second VAD in the sense that the primary voice activity decision is made by the second VAD without having been processed by the hangover addition unit of said second VAD.

15. The first VAD according to claim 10, wherein the input circuit is configured to receive only one signal from one of said second VADs.

16. The first VAD according to claim 10, wherein the input circuit is configured to receive a plurality of signals from a plurality of said second VADs.

17. The first VAD according to claim 10, wherein the voice activity decisions indicated in the signals received from the primary voice detector and the one or more second VADs are combined in dependence on input signal properties.

18. The first VAD according to claim 17, wherein the input signal properties comprise at least one of estimated signal-to-noise-ratio and background characteristics.

19. The method according to claim 1, wherein at least one of the one or more second VADs is configured to generate lower activity or introduce less speech clipping than the first VAD under certain input conditions comprising one or more of a certain noise level, a certain signal-to-noise ratio, and a certain noise characteristic.

20. The method according to claim 1, wherein, under certain input conditions, the primary voice activity decision from the first VAD's primary voice detector falsely indicates voice activity or clips speech, and wherein said combining is performed using combination logic that is adapted to said certain input conditions such that the one or more decisions from the one or more second VADs only modify the primary voice activity decision of the first VAD's primary voice detector under said certain input conditions, wherein said certain input conditions comprise at least one of a certain noise level, a certain signal-to-noise ratio, and a certain noise characteristic.

21. The method according to claim 1, wherein said combining comprises combining the primary voice activity decision made by the primary voice detector of said first VAD, a primary voice activity decision made by the primary voice detector of a given one of the one or more second VADs, and a final voice activity decision output by the hangover addition unit of said given one of the one or more second VADs.

22. The method according to claim 1, wherein said combining comprises combining the primary voice activity decision made by the primary voice detector of said first VAD and a primary voice activity decision made by the primary voice detector of one of the one or more second VADs using a first combination logic, and combining the result with a final voice activity decision output by the hangover addition unit of one of the one or more second VADs using a second combination logic different from the first combination logic.

* * * * *